Nov. 23, 1937.       H. OEHMEN       2,100,147
STEERING WHEEL
Filed Nov. 27, 1933       3 Sheets-Sheet 1

Inventor:
H. Oehmen
By: Marks & Clark
Attys.

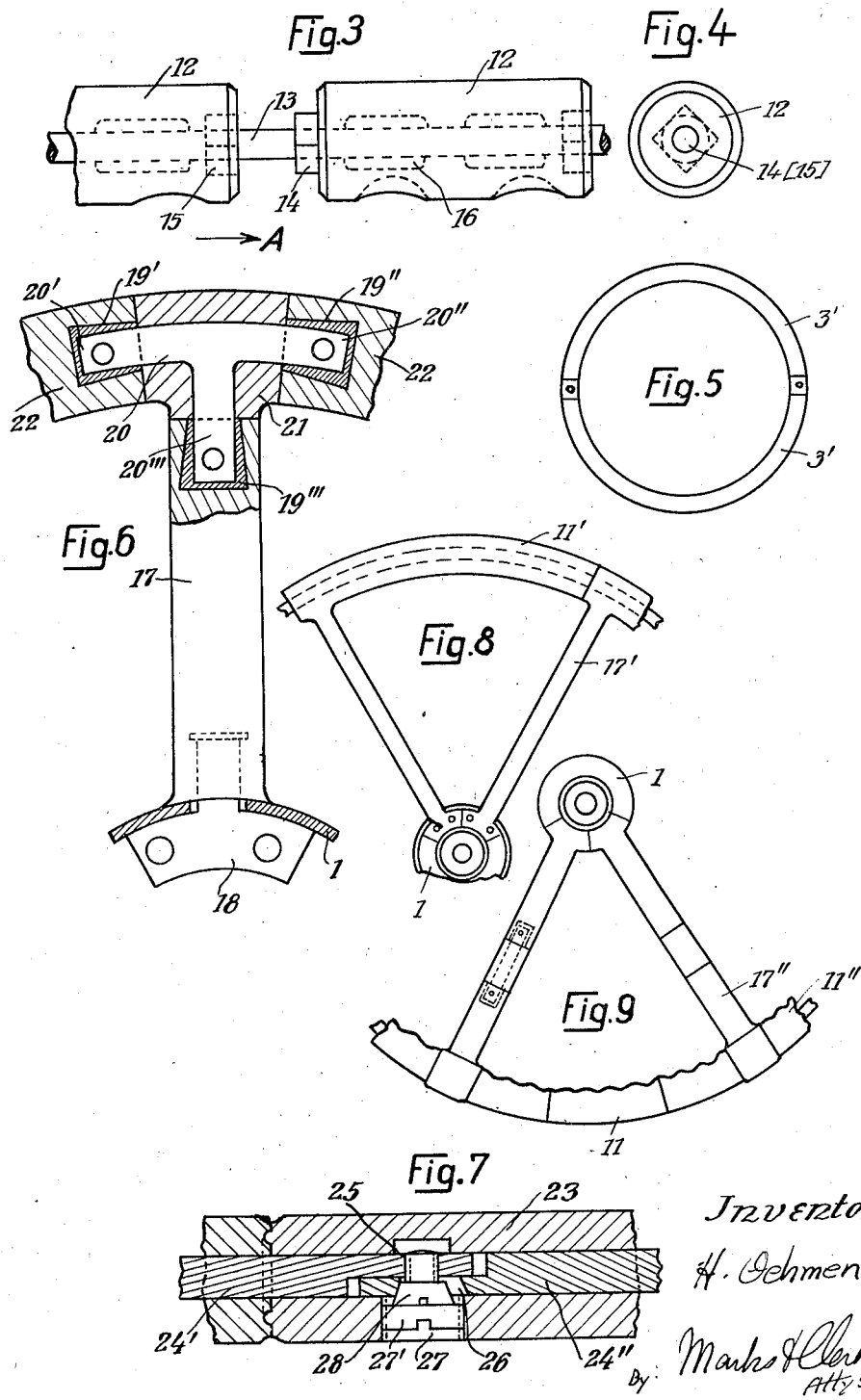

Nov. 23, 1937.   H. OEHMEN   2,100,147
STEERING WHEEL
Filed Nov. 27, 1933   3 Sheets-Sheet 3
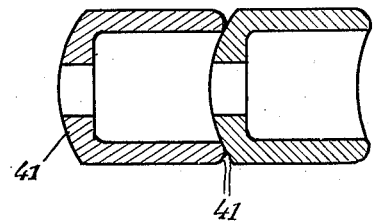
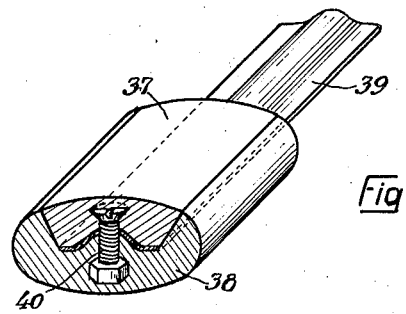
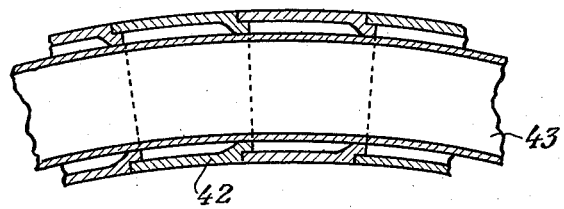 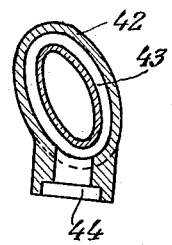

Patented Nov. 23, 1937

2,100,147

UNITED STATES PATENT OFFICE 2,100,147

STEERING WHEEL

Hans Oehmen, Berlin-Schmargendorf, Germany

Application November 27, 1933, Serial No. 699,965
In Germany November 28, 1932

1 Claim. (Cl. 74—552)

This invention relates to steering wheels for use in connection with motor-driven vehicles, such as motor cars, flying machines, and the like. Such steering wheels have already been made of artificial masses, such as artificial resin. The object of my invention is to simplify the manufacture of such steering wheels, and I attain the object in view by composing said wheels of parts or members which either have all the same size and shape or form different sets in which the parts or members are likewise of the same size and shape, there being then the parts of two or more of said sets required to compose a wheel.

It was already known to make steering wheels of such artificial masses or compositions but in accordance with the usual method of treatment, the steering wheel was hitherto always produced as a whole body out of these artificial masses or compositions which was subjected to a pressing process and pressed around the frame structure of wire, sheet metal or the like.

It was known to treat or work up other natural substances which owing to their natural properties rendered it necessary to make the wheel out of several individual parts because it was not possible to make the wheel out of one piece. Wood and leather were used for that purpose. In the case of artificial resins etc., it has hitherto been found advantageous to make the steering wheels out of one piece whereby the work of assembling individual parts was dispensed with. Moreover, owing to the brittleness of these masses or compositions, it was necessary to tightly press them directly onto the parts (mostly metal) serving as the frame structure.

In contradistinction to the above known method which necessitates the use of very large and expensive molds, the present invention has found that special advantages are obtainable by producing the artificial masses or compositions in equal parts in which case, instead of the large expensive molds, only small molds are required for the pressing or spraying process. Owing to the great accuracy of these methods of production, it is possible to make the sensitive individual parts, which are subjected to pressure etc., in such an exact manner that it is no longer necessary to press them directly onto the parts of the frame structure. They are made so exact and uniform that a mere stringing thereof is sufficient. The invention also comprises the further constructional forms explained hereinafter.

The above relates to the felly or rim of the wheel exclusively or to the spokes thereof exclusively or to both parts or members of the steering wheel, and instead of making the wheel entirely of the respective mass or composition, it may consist of a metal skeleton, to which the individual parts made of the respective mass are affixed. Instead of a complete separate skeleton individual metal parts may be used. At any rate the skeleton or skeleton parts and the mass parts are securely connected with each other which may be done in a variety of manners, as fully described hereinafter.

The invention is illustrated diagrammatically and by way of example on the accompanying drawings, in which Figure 1 is an axial section through a steering wheel designed according to this invention, a portion of the wheel being omitted. Figure 2 is chiefly a plan of a portion of the same wheel, and partly a section in the plane of the wheel. Figure 3 shows details of another constructional form, and Figure 4 is a frontal or end view of one of said details. Figure 5 is a plan of a felly or rim of metal to which members consisting of the artificial mass are to be attached, this figure being drawn to a greatly reduced scale relatively to Figs. 1 and 2. Figure 6 shows details of another constructional form, partly in plan and chiefly in section in the plane of the wheel. Figure 7 shows likewise details, in section, of another constructional form, and Figures 8 and 9 show parts of two more constructional forms in which the individual spokes, or portions of the same, are made integral with portions of the rim or felly.

Fig. 10 shows a detail of a modified form of spoke.

Fig. 11 shows a detail of a modified form of felly.

Fig. 12 is a sectional detail of a further modified form of a felly, and

Fig. 13 is a cross sectional view of the arrangement shown in Fig. 12.

Figure 1:
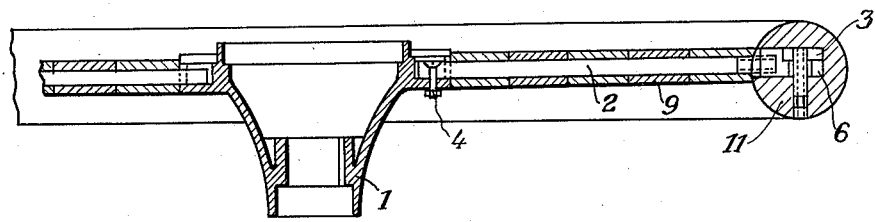
Figure 2:
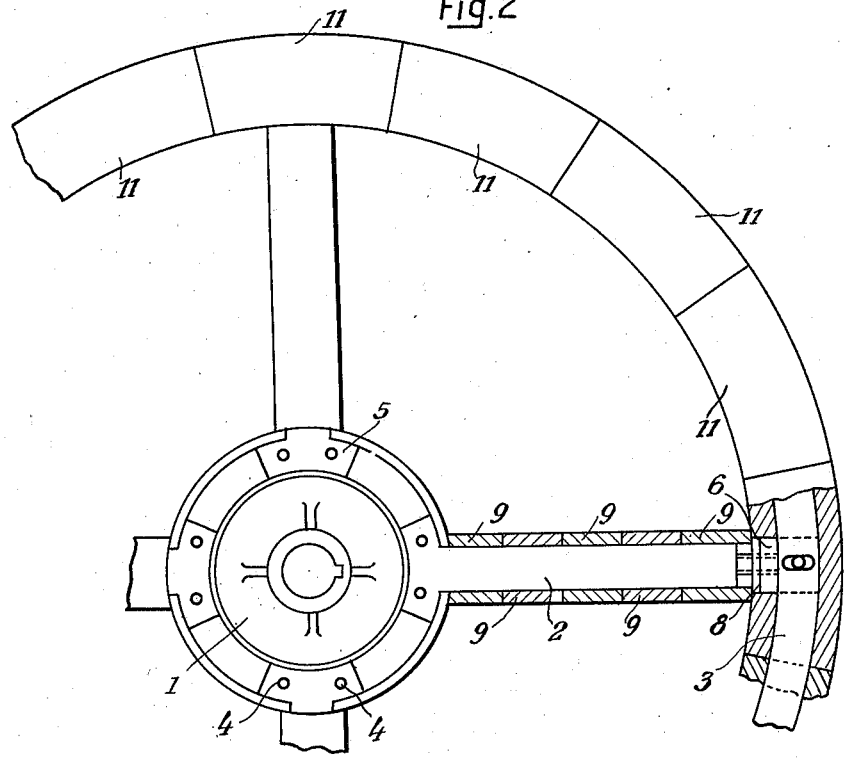

Referring to Figs. 1 and 2, 1 denotes the hub of the steering wheel, and 2 and 3 are members of a metallic frame or skeleton, consisting of the spokes 2 and the annulus 3. The spokes are at their inner end firmly connected with said hub, and at their outer ends with said annulus or rim. The inner ends of the spokes have enlargements or lugs 5 which are secured to the hub by means of screws 4. At the other end of each spoke is a threaded projection upon which an intermediate member 6 constituting a sort of nut is screwed. These members or nuts 6 connect the spokes or, more precisely, the spoke cores (2) with the rim or felly or, more precisely, rim or felly core 3. The nuts 6 serve also for producing an axial pressure upon the sleeve-like mass parts 9 which enclose the metallic spoke cores, said mass parts being thereby firmly pressed against one another. The spoke cores and the felly core consist of flat bar iron, as appears from the Figs. 1 and 2, and the sectional shape of the mass parts 9 is accommodated thereto, whereas the mass parts 11 which enclose the felly core are circular in transverse section, as shown in Fig. 1. It is obvious that the mass parts cannot turn upon their appertaining cores.

The assembling is effected by stringing the individual uniform pieces of artificial resin on the ring 3. The members 9 are then placed on the spokes 2 and the intermediate piece 6 is screwed onto the thread on the outer end of the spoke 2 to such an extent that the spoke has the correct length. The outer end of the spoke 2 is inserted with the connecting member 6 thereon into the corresponding groove of the felly 11 under the ring 3 and the inner end of the felly is placed in the hub. The screw 45 is screwed through the threaded opening of the felly 11 into the ring 3.

The mass parts 11 are circularly curved and abut against one another around the felly core 3. They may be coupled with one another in the manner shown in Fig. 3, according to which each member 12 (which is a substitute for the member 11 of Fig. 2) is provided at one end with a square projection 14 and at the other end with a correspondingly shaped cavity 15 which receives the projection 14 of the adjacent member 12. 13 denotes the felly core which is of circular transverse section in this example. The members 12 can nevertheless not be turned on the core 13 owing to their curved shape which is, of course, the same as in Fig. 2.

The wheel parts 9 and 11 (Figs. 1 and 2), as well as the corresponding parts occurring in the modifications dealt with in the following portion of this specification and shown in the appertaining figures consist of artificial resin or polystyrol celluloid. In order to save material, especially the felly members may have hollow spaces, for instance such as 16, Fig. 3.

If the felly core is made of one piece, it must, of course, be split in order to render it possible to shove the mass members thereon, whereafter the ends at the place of splitting must be connected with one another. In order to obviate that splitting, the core may be made in two semi-circular parts or halves, as 3' and 3" in Fig. 5.

In the modification shown in Fig. 6 spoke cores proper and a felly core proper are dispensed with, and in lieu thereof individual T-shaped metallic connecting members 20 are provided which are embedded in mass members 21 located opposite the outer end of the spokes 17, that likewise consist of the artificial mass. From the member 20 project forth the three ends 20', 20" and 20'" of the metallic connecting member 20 which consists of iron or another suitable metal, preferably such a one, the coefficient of expansion of which is the same, or approximately the same, as that of the artificial mass. The outer end of the spoke 17 is provided with an exteriorly conical socket 19'", and similar sockets 19' and 19" are inserted into the adjacent ends of the mass members 22 of the felly or rim of the wheel. The sockets are inserted into the members concerned while these are being manufactured, and owing to their conical shape they are very securely retained in said members. The three sockets receive the three ends of the metallic connecting member 20 with which they are connected by bolts extending, of course, also through the artificial mass.

Figure 7 shows a further modification in which the felly mass members 23 can be subjected to a certain pressure in the circumferential direction of the wheel, that pressure becoming active especially at the abutting end faces of the members 23. The felly core ends (this core being practically such a one as in Figs. 1 and 2) 24' and 24" are so reduced in thickness as to form tongues which overlap one another. The tongue of the core end 24' is provided with a threaded bore and the other tongue has an aperture 26 with a conical wall. A screw 25, the head 28 of which is likewise conical and corresponds to the conical shape of said aperture is screwed into the bore of the tongue 24' and its head is located in the said aperture and contacts with the conical wall of the same, the arrangement being such that when the screw is drawn home, the felly core ends are drawn towards one another whereby the felly mass parts 23 are likewise drawn against one another. The mass member 23 has a lateral bore 27 which is threaded and in which is located a correspondingly threaded stopper 27' by which the screw 25, 28 is retained in its proper position.

The constructional form shown in Fig. 7 may be modified in this way that simultaneously with connecting the ends 24' and 24" with one another, also the adjacent end of the adjacent spoke core is connected with said parts.

In Fig. 8 each of the spokes 17' is made integral with one of the felly mass members 11' and in Fig. 9 the spoke parts 17" are made integral with the felly parts 11". The idea of invention in these modifications is the same as in all other constructional forms, viz. to make the steering wheel (consisting of an artificial mass) not in one piece, but to compose it of a plurality of pieces of like size and shape, or of sets of members, the individual parts of which have the same size and shape. This is true also of Figs. 8 and 9.

Just as the connections between the felly parts and the spokes at the portions where the spokes join the felly can be designed in a variety of ways, so also the mass members themselves can be united with one another in a variety of manners. In Fig. 10 which relates to spokes of shaped sheet-metal (39), the mass members enclosing the metal strips constituting the spokes consist of fluted parts 38 and of ledge-like parts 37 filling up the groove of the part 38, that is to say, there is left, of course the space requisite for the reception of the metallic strip 39. The three parts are connected with one another by screws and nuts 40 for which, of course, also the necessary bores or cavities are provided.

In Fig. 11 the members enclosing the felly core and surrounding the steering wheel are cup-shaped and their closed ends have calotte-shaped end faces 41, each of which contacts with the open end of the adjacent cup. This constructional form presents the advantage that the members 41 can adjust themselves easily to any radius of curvature of the steering wheel.

In Figs. 12 and 13 the felly core consists of a pressed steel tube 43 having oblong sectional transverse shape and this section is located obliquely with respect to the plane of the wheel or of the spokes respectively as appears from the connecting branch 44 in Fig. 13. In this connection it is to be noted that in this form the ends of the tube 43 are designed in the manner shown in Fig. 7, in that, for example short pieces of flat iron are welded to the ends of the tube and designed according to Fig. 7.

I wish it to be understood that I do not limit myself to the constructional forms shown on the drawing merely by way of example. A variety of other constructional forms is possible, and it is also possible to design the mass members in such a manner that they are suited for steering wheels of different diameters. This is true also of members manufactured according to the die-casting method. There may be made standardized members, the sizes of which are determined with respect to the differences in the radii of the several sizes of the steering wheels used. If, for instance, the diameters of the steering wheels amount to 350, 400, 450, 500 mm., then the length of the radius increases by 25 mm., and the length of the mass members for the spokes is, therefore, to be 25 mm., of which there are as many employed as are requisite for the respective radius. Also as regards the length of the mass members 21 (Fig. 6), that may be so chosen that these members can be used in steering wheels of different diameters, their curve being then suitably chosen.

The invention is, finally, applicable also to steering wheels of oval shape or any other particular shape for particular vehicles.

I claim:

A steering wheel for motor vehicles including a metallic rim of considerable transverse section and a wrapping consisting of a plurality of identically shaped parts having passages corresponding to said section through which said rim passes, said parts being composed of compressed artificial resin, each of said parts being a fractional part of a quadrant the end of said parts adapted to fit into each other on circumferences of different radii and a separable and adjustable locking means connecting the overlapping ends of said metallic core, said locking means consisting of a bolt with a screw adapted to cooperate with a thread in one of said overlapping ends and with a conical screw-head adapted to engage with a conical bore in the other of said overlapping ends.

HANS OEHMEN.